United States Patent
Kojima et al.

(10) Patent No.: US 12,136,746 B2
(45) Date of Patent: Nov. 5, 2024

(54) METHOD FOR PRODUCING BUSBAR, BUSBAR, AND BATTERY MODULE

(71) Applicant: SANYO Electric Co., Ltd., Osaka (JP)

(72) Inventors: Yasumasa Kojima, Hyogo (JP); Hiroyuki Mihara, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 848 days.

(21) Appl. No.: 17/286,032

(22) PCT Filed: Sep. 2, 2019

(86) PCT No.: PCT/JP2019/034420
§ 371 (c)(1),
(2) Date: Apr. 16, 2021

(87) PCT Pub. No.: WO2020/090216
PCT Pub. Date: May 7, 2020

(65) Prior Publication Data
US 2021/0384589 A1     Dec. 9, 2021

(30) Foreign Application Priority Data
Oct. 29, 2018   (JP) ................................ 2018-202973

(51) Int. Cl.
*H01M 50/505*    (2021.01)
*H01M 10/48*     (2006.01)
(Continued)

(52) U.S. Cl.
CPC ....... *H01M 50/505* (2021.01); *H01M 10/482* (2013.01); *H01M 50/204* (2021.01);
(Continued)

(58) Field of Classification Search
CPC ............. H01M 50/505; H01M 50/569; H01M 50/204; H01M 10/482; H02G 5/00; H02G 5/002
See application file for complete search history.

(56) References Cited

U.S. PATENT DOCUMENTS 4,922,068 A * 5/1990 Bangs .................. H01H 1/5822
                                                       200/266
7,604,507 B1 * 10/2009 Millon ................ H01M 50/522
                                                       439/627
(Continued)

FOREIGN PATENT DOCUMENTS

| JP | 6-140020 | 5/1994 |
| JP | H11-067184 A | 3/1999 |
| JP | 2017-033694 A | 2/2017 |

OTHER PUBLICATIONS

International Search Report of PCT application No. PCT/JP2019/034420 dated Oct. 21, 2019.
(Continued)

*Primary Examiner* — Jeremiah R Smith
(74) *Attorney, Agent, or Firm* — WHDA, LLP (57) ABSTRACT

A method for producing busbar includes a step of applying pressure to pressure-weld a plurality of electric wires in a plurality of first regions in a bundle of the plurality of electric wires, the first regions being arranged at a predetermined interval in the extending direction of the bundle, to form a plurality of terminal joints that are joined to the output terminals of the respective batteries.

12 Claims, 5 Drawing Sheets

(51) Int. Cl.
*H01M 50/204* (2021.01)
*H01M 50/209* (2021.01)
*H01M 50/224* (2021.01)
*H01M 50/298* (2021.01)
*H01M 50/50* (2021.01)
*H01M 50/569* (2021.01)
*H01M 50/289* (2021.01)

(52) U.S. Cl.
CPC ....... *H01M 50/209* (2021.01); *H01M 50/224* (2021.01); *H01M 50/298* (2021.01); *H01M 50/50* (2021.01); *H01M 50/569* (2021.01); *H01M 50/289* (2021.01)

(56) References Cited

U.S. PATENT DOCUMENTS

| | | | | |
|---|---|---|---|---|
| 2017/0345526 | A1* | 11/2017 | Jones | H01R 4/023 |
| 2018/0097322 | A1* | 4/2018 | Harris, III | H01M 50/505 |
| 2019/0123318 | A1* | 4/2019 | Fees | H01M 50/51 |

OTHER PUBLICATIONS

English Translation of Chinese Search Report dated Aug. 26, 2022, issued in counterpart CN application No. 201980071839.5. (5 pages).

\* cited by examiner

METHOD FOR PRODUCING BUSBAR, BUSBAR, AND BATTERY MODULE

CROSS-REFERENCE TO RELATED APPLICATIONS

This application is a U.S. national stage application of the PCT International Application No. PCT/JP2019/034420 filed on Sep. 2, 2019, which claims the benefit of foreign priority of Japanese patent application No. 2018-202973 filed on Oct. 29, 2018, the contents all of which are incorporated herein by reference.

TECHNICAL FIELD

The present invention relates to a method for producing a busbar, a busbar, and a battery module.

BACKGROUND ART

As a power source requiring a high output voltage, such as a power source for a vehicle, a battery module in which a plurality of batteries are electrically connected is known. Conventionally, in such a battery module, output terminals of adjacent batteries have been connected to each other by busbars. With respect to the busbar used for the battery module, PTL 1 discloses a technique of providing a bend in the middle of a plate-shaped busbar to absorb relative displacement between output terminals connected by the busbar.

CITATION LIST

Patent Literature

PTL 1: Unexamined Japanese Patent Publication No. 6-140020

SUMMARY OF THE INVENTION

In recent years, a further increase in the capacity of the battery module has been demanded, and for satisfying this demand, the capacity of the battery has been increased. As the capacity of the battery increases, the amount of dimensional change in the battery increases, so that the amount of relative displacement between the output terminals connected by the busbar increases. Therefore, the busbar is required to follow the larger displacement of the output terminals to increase the stability of the electrical connection between the batteries.

The present invention has been made in view of these circumstances, and an object of the present invention is to provide a technique for enhancing the stability of electrical connection between batteries.

One aspect of the present invention is a production method for a busbar. The production method is a method for producing a busbar that electrically connects a plurality of batteries, the method including a step of applying pressure to pressure-weld a plurality of electric wires in a plurality of first regions in a bundle of the plurality of electric wires, the first regions being arranged at a predetermined interval in an extending direction of the bundle, to form a plurality of terminal joints that are joined to output terminals of the respective batteries.

Another aspect of the present invention is a busbar. The busbar is a busbar electrically connecting a plurality of batteries, the busbar including: a plurality of terminal joints that are joined to output terminals of the respective batteries; and a coupler that connects the plurality of terminal joints. The coupler is formed of a non-pressure-welded part in a bundle of a plurality of electric wires, and each of the plurality of terminal joints is formed of a pressure-welded part in the bundle of the plurality of electric wires.

Another aspect of the present invention is a battery module. The battery module includes the busbar of the above aspect and a plurality of batteries electrically connected by the busbar.

Note that any combination of the above components and the expression of the present invention converted between methods, devices, systems, and the like are also effective as aspects of the present invention.

According to the present invention, it is possible to enhance the stability of the electrical connection between the batteries.

BRIEF DESCRIPTION OF DRAWINGS

FIG. 3(A) to FIG. 3(D) are side views illustrating a production process for the busbar.

FIG. 4(A) to FIG. 4(E) are side views illustrating a production process for a busbar according to Modification 1.

DESCRIPTION OF EMBODIMENT

Hereinafter, the present invention will be described based on a preferred exemplary embodiment with reference to the drawings. The exemplary embodiment does not limit the invention but is illustrative, and not all features and combinations thereof described in the exemplary embodiment are necessarily essential to the invention. The same or equivalent components, members, and processes illustrated in the drawings are denoted by the same reference numerals, and redundant descriptions are omitted as appropriate. Further, the scales and shapes of the respective parts illustrated in the drawings are set for convenience in order to facilitate the description and are not to be interpreted in a limited manner unless otherwise mentioned. Further, when terms such as "first" and "second" are used in the present specification or claims, the terms are not intended to indicate any order or importance but to distinguish one configuration from another, unless otherwise mentioned. In the drawings, illustration is made, omitting some of the members which are not important for explaining the exemplary embodiment.

Figure 1:
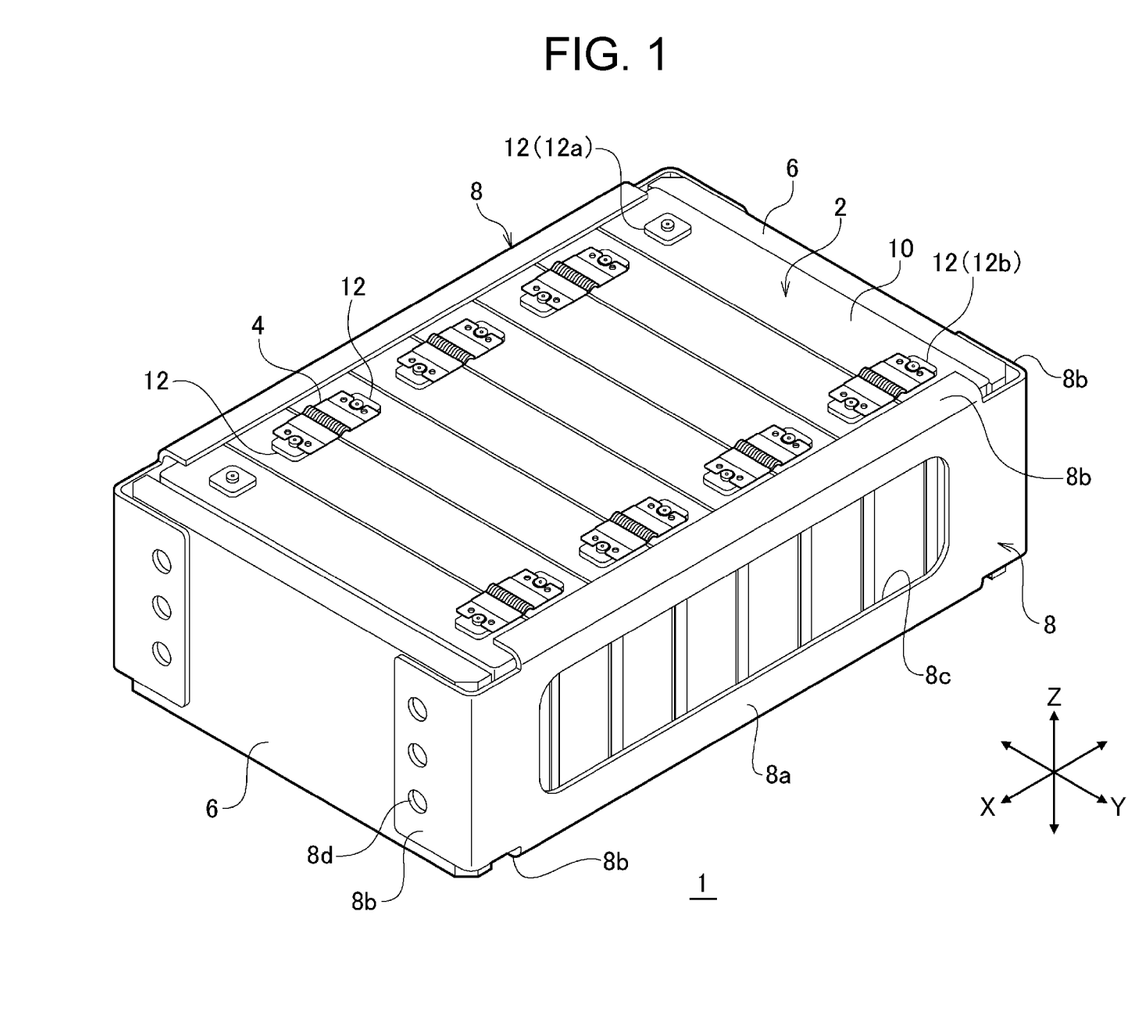
FIG. 1 is a perspective view of a battery module according to an exemplary embodiment.

FIG. 1 is a perspective view of a battery module according to the exemplary embodiment of the present invention. Battery module 1 mainly includes a plurality of batteries 2, a plurality of busbars 4, a pair of end-plates 6, and a pair of restraint members 8.

Each battery 2 is, for example, a rechargeable secondary battery such as a lithium-ion battery, a nickel-hydrogen battery, or a nickel-cadmium battery. Battery 2 is a so-called square battery and has a flat rectangular parallelopiped outer can. An opening (not illustrated) having a substantially rectangular shape is provided on one surface of the outer can, and an electrode body, an electrolyte, and the like are housed in the outer can via the opening. Sealing plate 10 for sealing the outer can is provided in the opening of the outer can. Sealing plate 10 is a rectangular plate.

Sealing plate 10 is provided with positive output terminal 12 near one end in the longitudinal direction and negative output terminal 12 near the other end. The pair of output terminals 12 are electrically connected to a positive electrode plate and a negative electrode plate constituting the electrode body. Hereinafter, as appropriate, positive output terminal 12 will be referred to as positive terminal 12a, and negative output terminal 12 will be referred to as negative terminal 12b. When it is not necessary to distinguish the polarity of output terminal 12, positive terminal 12a and negative terminal 12b are collectively referred to as output terminal 12. The outer can, sealing plate 10, and output terminal 12 are conductive materials, such as metal. Sealing plate 10 and the opening of the outer can are joined by welding or the like. Each output terminal 12 is inserted through a through hole (not illustrated) formed in sealing plate 10. An insulating seal member is interposed between each output terminal 12 and each through hole.

In the present exemplary embodiment, for convenience of description, the surface on the side where sealing plate 10 is disposed is a top surface of battery 2, and the surface on the side opposite to sealing plate 10 is a bottom surface of battery 2. Battery 2 has two main surfaces connecting the top surface and the bottom surface. The main surface has the largest area among the six surfaces of battery 2. The main surface is a long side surface connected to the long sides of the top surface and the bottom surface. The remaining two surfaces, except for the top surface, the bottom surface, and the two main surfaces, are the side surfaces of battery 2. The side surface is a short side surface connected to the short sides of the top surface and the bottom surface. These directions and positions are specified for convenience. Thus, for example, it is not meant that a portion defined as the top surface in the present invention is always located above a part defined as the bottom surface.

Sealing plate 10 is provided with a safety valve (not illustrated) between the pair of output terminals 12. The safety valve is configured to open when the internal pressure of the outer can rises to a predetermined value or more and to release the internal gas. The safety valve of each battery 2 is connected to a gas duct (not illustrated), and the gas inside the battery is discharged from the safety valve to the gas duct.

The plurality of batteries 2 are laminated at predetermined intervals with the main surfaces of adjacent batteries 2 facing each other. Note that "lamination" means arranging a plurality of members in any one direction. Thus, the lamination of batteries 2 includes horizontally arranging the plurality of batteries 2. Batteries 2 are arranged such that output terminal 12 face the same direction. In the present exemplary embodiment, for convenience, each battery 2 is disposed such that output terminal 12 faces vertically upward. Two adjacent batteries 2 are laminated such that positive terminal 12a of one battery 2 and negative terminal 12b of another battery 2 are adjacent to each other.

Positive terminal 12a and negative terminal 12b are electrically connected by busbar 4. That is, busbar 4 electrically connects the plurality of batteries 2. Output terminal 12, located on the outermost side of the series connection, is electrically connected to an external connection terminal (not illustrated). The external connection terminal is connected to an external load via wiring led to the outside of battery module 1. Note that output terminals 12 of the plurality of adjacent batteries 2 of the same polarity may be connected in parallel by busbar 4 to form a battery block, and the battery blocks may be connected to each other, or the battery blocks and battery 2 may be connected in series. The structure of busbar 4 will be described later in detail.

Battery module 1 has a plurality of separators (not illustrated). Each separator is also called an insulating spacer and is disposed between two adjacent batteries 2 to electrically insulate the outer cans of two adjacent batteries 2 from each other. Further, the separator is disposed between battery 2 and end-plate 6 to electrically insulate the outer can of battery 2 from end-plate 6. Each separator is made of, for example, an insulating resin. Examples of the resin constituting the separator include thermoplastic resins such as polypropylene (PP), polybutylene terephthalate (PBT), polycarbonate (PC), and Noryl (registered trademark) resin (modified PPE).

The plurality of laminated batteries 2 and the plurality of separators are sandwiched by the pair of end-plates 6. Each end-plate 6 is made of, for example, a metal plate. The pair of end-plates 6 are arranged so as to be adjacent to batteries 2 at both ends in laminating direction X of batteries 2 via the separators. The surface of end-plate 6 facing the main surface of battery 2 is provided with a screw hole (not illustrated) into which a screw (not illustrated) is screwed.

The pair of restraint members 8 are also called bind bars and are elongated members with longitudinal directions being laminating direction X. The pair of restraint members 8 are arranged to face each other in direction Y orthogonal to laminating direction X and parallel to the longitudinal direction of sealing plate 10. The plurality of batteries 2, the plurality of separators, and the pair of end-plates 6 are interposed between the pair of restraint members 8. Each restraint member 8 has rectangular flat part 8a extending in parallel with the side surface of battery 2, and four eaves 8b projecting from the respective end side of flat part 8a toward battery 2.

Flat part 8a is provided with opening 8c for exposing the side surface of battery 2. Opening 8c is preferably arranged so as not to affect the rigidity of restraint member 8 against the external force in laminating direction X as much as possible. This can reduce the weight of restraint member 8 while maintaining the rigidity of restraint member 8. Two eaves 8b facing each other in laminating direction X are provided with through holes 8d through which screws are inserted.

Battery module 1 is assembled as follows, for example. That is, first, a plurality of batteries 2 and a plurality of separators are alternately laminated, and these are sandwiched between the pair of end-plates 6 in laminating direction X to form an assembly. The assembly is sandwiched in direction Y by the pair of restraint members 8. Each restraint member 8 is aligned such that through hole 8d overlaps the screw hole of end-plate 6. The screw is inserted into through hole 8d and screwed into the screw hole. Thus, the plurality of batteries 2 and the plurality of separators are restrained by engaging the pair of restraint members 8 with the pair of end-plates 6.

The plurality of batteries 2 are positioned in laminating direction X by being clamped in laminating direction X by restraint members 8. Further, the plurality of batteries 2 have bottom surfaces in contact with eaves 8b on the lower side of restraint member 8 via the separators, and have the top surfaces in contact with eaves 8b on the upper side of restraint member 8 via the separators, so that the batteries 2 are positioned in direction Z in which the top surfaces and the bottom surfaces are arranged. After the completion of the positioning, busbar 4 is attached to output terminal 12 of each battery 2, and each output terminal 12 is connected electrically. Subsequently, a cover member (not illustrated) is attached so as to cover the top surface of each battery 2 to obtain battery module 1.

Figure 2:
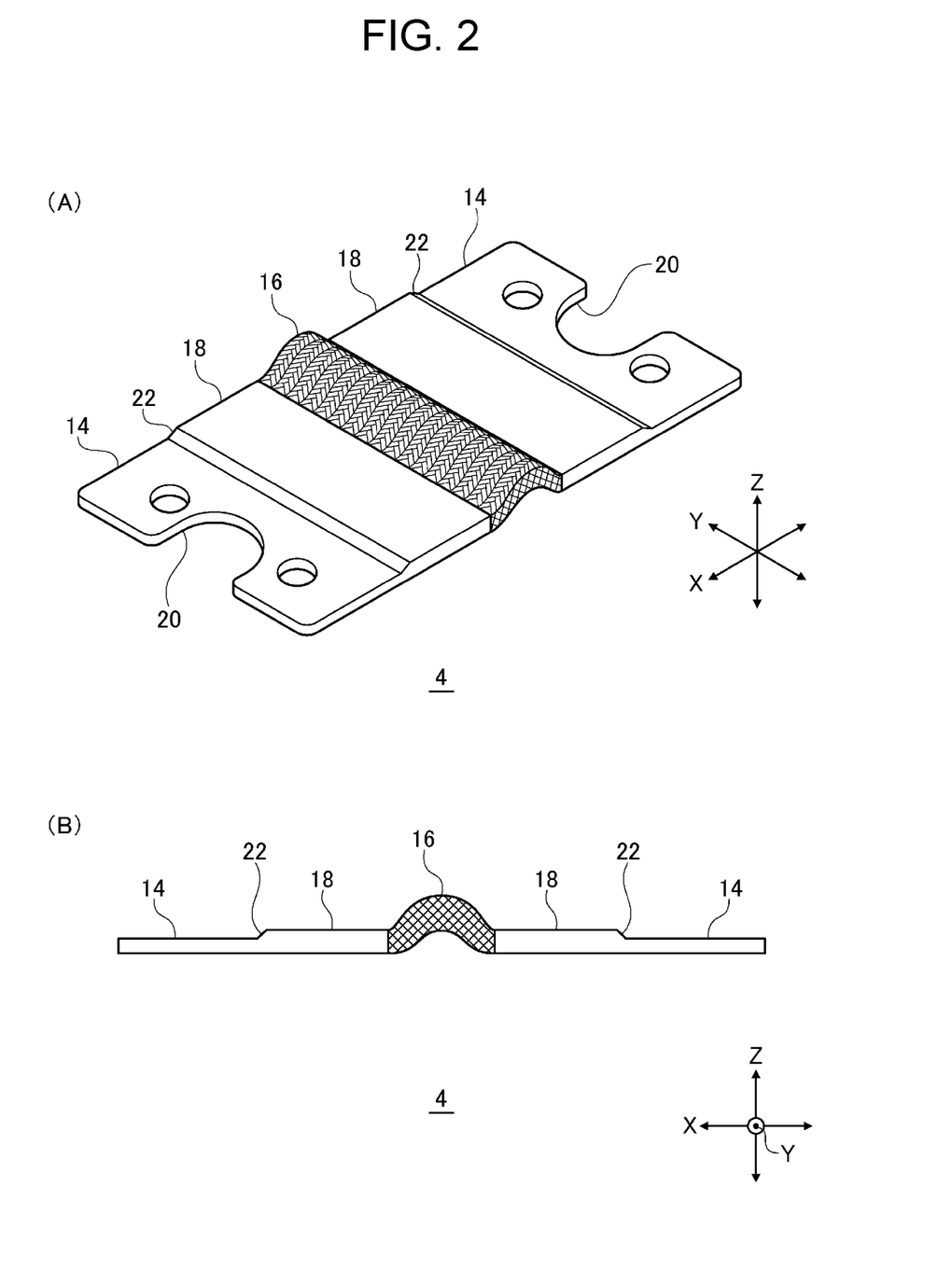
FIG. 2(A) is a perspective view of a busbar.
FIG. 2(B) is a side view of the busbar.

Next, busbar 4 according to the present exemplary embodiment will be described in detail. FIG. 2(A) is a perspective view of the busbar. FIG. 2(B) is a side view of the busbar. Busbar 4 includes a plurality of terminal joints 14 and coupler 16. Respective terminal joints 14 are joined to output terminals 12 of respective batteries 2. In the present exemplary embodiment, two batteries 2 are connected in series by busbar 4. Therefore, busbar 4 has two terminal joints 14.

Coupler 16 connects the plurality of terminal joints 14. Coupler 16 is formed of a non-pressure-welded part in a plurality of electric wires, that is, a bundle of conductive wires. Hence the electric wires are not connected to each other in coupler 16. In the present exemplary embodiment, the bundle of electric wires constituting coupler 16 is a flat stranded wire in which a plurality of electric wires are stranded. Examples of the material of the electric wire include copper and aluminum. When the electric wire is a copper wire, nickel plating or tin plating may be applied. Coupler 16 of the present exemplary embodiment is curved so as to protrude in a direction away from battery 2.

Two terminal joints 14 are arranged at both ends of busbar 4 in laminating direction X of battery 2. Coupler 16 is disposed between two terminal joints 14 in laminating direction X. Busbar 4 of the present exemplary embodiment includes voltage detection line connector 18. Voltage detection line connector 18 is disposed between each terminal joint 14 and coupler 16. Therefore, busbar 4 has a structure in which terminal joint 14, voltage detection line connector 18, coupler 16, voltage detection line connector 18, and terminal joint 14 are arranged in this order in laminating direction X. A voltage detection line (not illustrated) for detecting the voltage of each battery 2 is electrically connected to either one of voltage detection line connectors 18 by welding or the like.

Each terminal joint 14 and each voltage detection line connector 18 are formed of a pressure-welded part in the bundle of the plurality of electric wires. That is, in the bundle of the plurality of electric wires, the pressure-welded region constitutes terminal joint 14 and voltage detection line connector 18, and the non-pressure-welded region constitutes coupler 16. Therefore, busbar 4 is an integrally formed metal product and does not have a structure for mutually fixing each part of terminal joint 14, coupler 16, and voltage detection line connector 18, such as a weld, caulking fixing part, or the like.

Each terminal joint 14 has fitting part 20 of output terminal 12. Fitting part 20 of the present exemplary embodiment is formed of a notch provided at the end of terminal joint 14. With output terminal 12 fitted to fitting part 20, terminal joint 14 is joined to output terminal 12 by welding or the like. Thus, each output terminal 12 is electrically connected via busbar 4.

Each terminal joint 14 has a flat plate shape with its surface being smooth so as not to interfere with the electrical connection with output terminal 12. Similarly, each voltage detection line connector 18 has a flat plate shape with its surface being smooth so as not to interfere with the electrical connection with the voltage detection line. The thickness of each voltage detection line connector 18 is larger than the thickness of each terminal joint 14. It is thereby possible to shorten the welding time by thinning terminal joint 14, and to prevent an increase in the electric resistance of busbar 4 by thickening voltage detection line connector 18. It is also possible to increase the heat capacity of busbar 4 by increasing the thickness of voltage detection line connector 18.

Each terminal joint 14 has slope 22 at an edge close to coupler 16, that is, an edge in contact with voltage detection line connector 18. Slope 22 has a thickness gradually increasing toward coupler 16. By providing slope 22, it is possible to enhance the coupling strength between terminal joint 14 and the side of coupler 16 (voltage detection line connector 18) can be enhanced. In other words, when busbar 4 is deformed, it is possible to prevent the stress from being concentrated on the coupler between terminal joint 14 and voltage detection line connector 18.

Coupler 16 formed of the non-pressure-welded part in the bundle of the plurality of electric wires can be deformed following this displacement when two output terminals 12 connected by busbar 4 are relatively displaced. Therefore, busbar 4 with coupler 16 has high flexibility as compared to a conventional busbar formed entirely of plate material.

Coupler 16 can follow the displacement of output terminal 12 in a direction intersecting with laminating direction X, that is, the direction of the YZ plane, by the deformation of coupler 16 itself. Coupler 16 has a curved shape protruding in direction Z. Hence coupler 16 can also follow the displacement of output terminal 12 in laminating direction X. Further, since coupler 16 of the present exemplary embodiment is formed of the flat stranded wire, the expansion and contraction of coupler 16 can follow the displacement of output terminal 12 in laminating direction X. When coupler 16 is formed of the flat stranded wire, coupler 16 may not have a curved shape.

Figure 3:
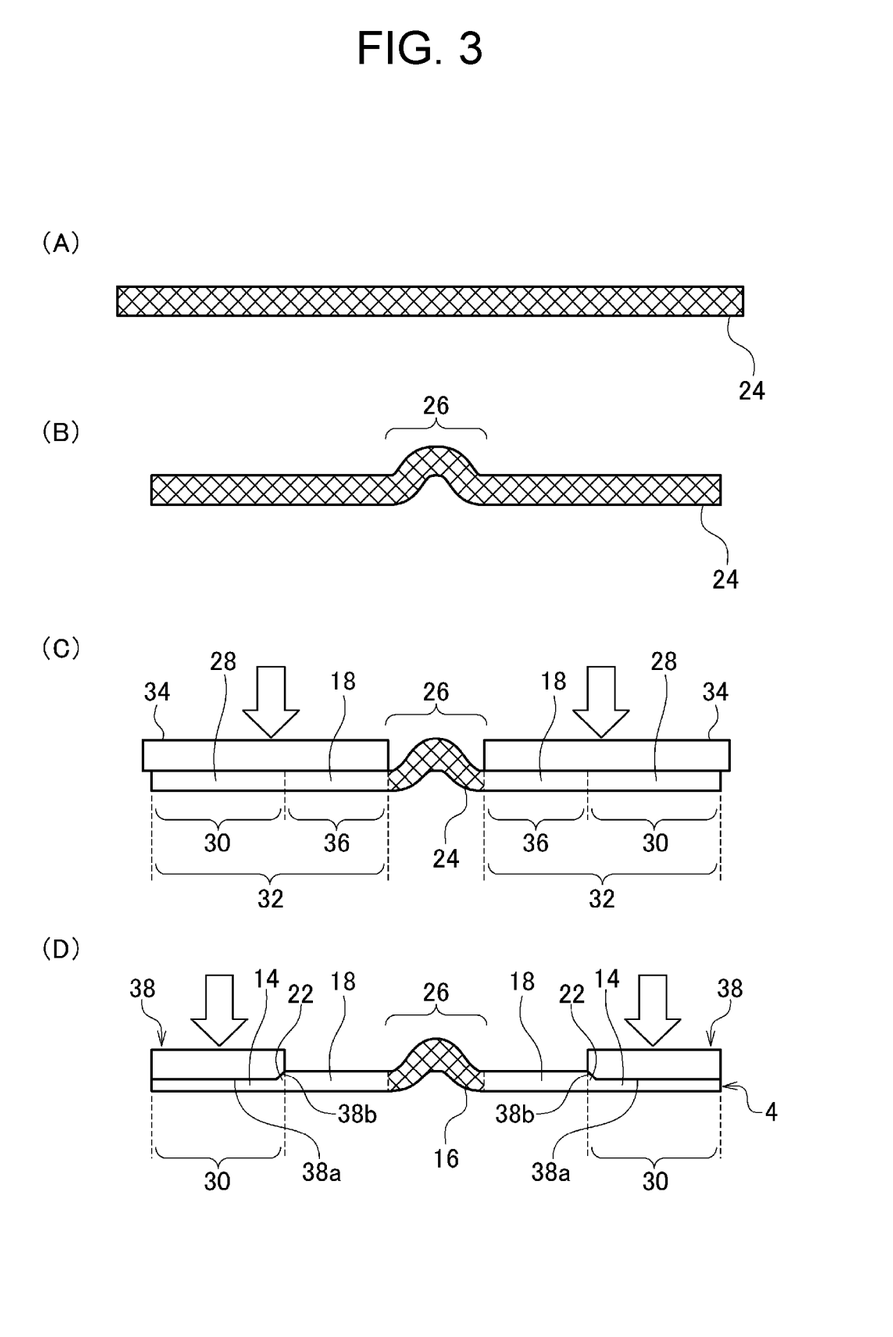

Next, a method for producing busbar 4 according to the present exemplary embodiment will be described in detail. FIG. 3(A) to FIG. 3(D) are side views illustrating a production process for the busbar. First, as illustrated in FIG. 3(A), for example, flat stranded wire 24 is prepared as a bundle of a plurality of electric wires. Flat stranded wire 24 has an elongated shape being long on one side. Then, as illustrated in FIG. 3(B), the center part of flat stranded wire 24 is bent to form curve 26.

Subsequently, as illustrated in FIG. 3(C), a step of forming precursor terminal joint 28 and voltage detection line connector 18 is performed. In this step, a predetermined region of flat stranded wire 24 is pressure-welded using a press device or the like to form precursor terminal joint 28 and voltage detection line connector 18. Specifically, in flat stranded wire 24, first press die 34 is pressed against a plurality of second regions 32 to apply predetermined pressure on each second region 32. In this step, the magnitude of the force applied to second region 32 is, for example, 1000 kN to 4000 kN. If necessary, second region 32 may be heated at the time when second region 32 is pressed by first press die 34.

Each second region 32 is a region including first region 30. First region 30 is a region where terminal joint 14 is finally formed, and first regions 30 are arranged at a predetermined interval in the extending direction of the bundle of the plurality of electric wires. In the present exemplary embodiment, two first regions 30 are located at both ends of the flat stranded wire 24. Accordingly, two second regions 32 are arranged with curve 26 interposed therebetween.

By first press die 34 being pressed against each second region 32, a plurality of electric wires are pressure-welded in each second region 32. As a result, precursor terminal joint 28 is formed in first region 30, and voltage detection line connector 18 is formed in remaining region 36 of second region 32 except for first region 30. Curve 26 located between two second regions 32 remains in the state of flat stranded wire 24 without being pressure-welded.

Subsequently, as illustrated in FIG. 3(D), a step of forming terminal joint 14 is performed. In this step, the plurality of first regions 30 are further pressure-welded using a press device or the like to form terminal joint 14. Specifically, second press die 38 is pressed against each first region 30 to apply predetermined pressure on each first region 30. In this step, the magnitude of the force applied to first region 30 is, for example, 1000 kN to 4000 kN. If necessary, first region 30 may be heated at the time when first region 30 is pressed by second press die 38.

By second press die 38 being pressed against first region 30, a plurality of electric wires, in other words, precursor terminal joint 28 is further pressure-welded in each first region 30. As a result, the thickness of precursor terminal joint 28 of each of first regions 30 is reduced to form a terminal joint 14.

Second press die 38 has tapered part 38b at the edge of pressure-welding surface 38a that comes into contact with flat stranded wire 24. Tapered part 38b is disposed at the edge of pressure-welding surface 38a, which is close to the non-pressure-welded region (curve 26 and remaining region 36) not pressure-contacted by second press die 38. Tapered part 38b is inclined from the center of pressure-welding surface 38a toward the outside so as to be separated from first region 30.

First region 30 is pressure-welded by second press die 38 having such a shape, thereby forming slope 22 at the edge close to the non-pressure-welded region in first region 30. Slope 22 has the thickness gradually increasing toward the non-pressure-welded region. Therefore, the step of forming terminal joint 14 includes the step of forming slope 22.

Curve 26 is not pressure-welded by either first press die 34 or second press die 38, and the plurality of electric wires remain in a non-pressure-welded state. This portion serves as coupler 16. By providing second press die 38 with a shape corresponding to fitting part 20, fitting part 20 can be formed simultaneously with the formation of terminal joint 14. By the above steps, busbar 4 is obtained.

As described above, the method for producing busbar 4 according to the present exemplary embodiment includes a step of applying pressure to pressure-weld a plurality of electric wires in a plurality of first regions 30 in a bundle of the plurality of electric wires, the plurality of first regions 30 being arranged at a predetermined interval in the extending direction of the bundle, to form a plurality of terminal joints 14 that are joined to output terminals 12 of respective batteries 2. That is, in the production method of busbar 4 according to the present exemplary embodiment, busbar 4 is produced by pressure-welding the bundle of the plurality of electric wires to form terminal joint 14 and using the non-pressure-welded part as coupler 16.

Accordingly, busbar 4 of the present exemplary embodiment obtained by such a production method includes: coupler 16 that connects the plurality of terminal joints 14 and is formed of the non-pressure-welded part in the bundle of plurality of electric wires; and the plurality of terminal joint 14 that is joined to output terminals 12 of respective batteries 2 and is formed of the pressure-welded part in the bundle of the plurality of electric wires. Battery module 1 of the present exemplary embodiment includes busbar 4 and a plurality of batteries 2 electrically connected by busbar 4.

Coupler 16 is formed of the bundle of the electric wires not joined to each other and hence has higher flexibility than a plate material. Busbar 4 absorbs the displacement of output terminal 12 by the deformation of coupler 16. Therefore, busbar 4 of the present exemplary embodiment can follow larger displacement of output terminal 12 as compared to the conventional busbar in which the bend is provided in the intermediate region of the plate material. Further, it is possible to follow the displacement of output terminal 12 in more directions. It is thereby possible to further prevent a load from being applied to the joint between terminal joint 14 and output terminal 12 due to the displacement between output terminals 12. As a result, it is possible to enhance the reliability and the stability of the connection between output terminals 12.

Further, in the conventional busbar in which the flexibility is ensured in the bend, in order to cope with an increase in the amount of displacement of output terminal 12 accompanying an increase in the capacity of battery 2, it has been necessary to increase the size of the bend. In this case, the size of the busbar in direction Z is increased, that is, the height of the busbar is increased. In contrast, busbar 4 of the present exemplary embodiment absorbs the displacement of output terminal 12 by coupler 16 formed of electric wires. Furthermore, coupler 16 of the present exemplary embodiment is flat stranded wire 24, and coupler 16 itself expands and contracts. It is thus possible to cope with an increase in the amount of displacement of output terminal 12 while preventing an increase in the height of busbar 4.

In addition, a conventional wiring cord, in which caulking terminals (also known as crimp terminals) are provided at both ends of an electric wire, and the two caulking terminals and the electric wire are arranged on a straight line, is difficult to install because the interval between two output terminals 12 is narrow. That is, the caulking terminal has a fixing part fixed to the electric wire in addition to a joint with the output terminal. Therefore, in the structure in which the two caulking terminals and the electric wire are arranged on a straight line, even the total dimension of the two caulking terminals in laminating direction X alone can exceed the interval between two output terminals 12. In this case, it is difficult to install a busbar having this structure unless the distance between adjacent batteries 2 is increased.

However, increasing the distance between batteries 2 leads to an increase in the size of battery module 1 or a decrease in the energy density, which runs counter to the demand for an increase in the capacity of batteries 2 and thus battery module 1. In contrast, in busbar 4 of the present exemplary embodiment, the non-pressure-welded part in the bundle of the plurality of electric wires constitutes coupler 16, and the pressure-welded part in the bundle constitutes terminal joint 14. That is, busbar 4 is an integrally formed metal product, and terminal joint 14 is continuous with coupler 16 without having a fixing part fixed to coupler 16. This enables an electrical contact between adjacent output terminals 12 connected to each other without increasing the distance between batteries 2. Further, a more extension region of coupler 16 in laminating direction X can be ensured. It is thereby possible to further enhance the followability of coupler 16 to the displacement of two output terminals 12.

As described above, according to busbar 4 obtained by the production method of the present exemplary embodiment, even when the amount of dimensional change in battery 2 increases as the capacity of battery 2 increases, stable electrical connection between batteries 2 can be maintained. That is, the stability of the electrical connection between batteries 2 can be enhanced. Thus, the reliability of battery module 1 can be enhanced. It is also possible to avoid an increase in the size of battery module 1 or a decrease in the energy density caused by an increase in the height of busbar 4 or an increase in the interval between batteries 2.

In the method for producing busbar 4 according to the present exemplary embodiment, the step of forming terminal joints 14 includes forming slope 22 at the edge close to the non-pressure-welded region in the first region 30. Slope 22 has a thickness gradually increasing toward the non-pressure-welded region. Accordingly, busbar 4 according to the present exemplary embodiment has, at the edge close to coupler 16 in terminal joint 14, slope 22 with its thickness gradually increasing toward coupler 16. By changing the thickness of the edge of terminal joint 14 stepwise or continuously as thus described, when the force is applied to busbar 4 from the outside, stress concentration on the edge of terminal joint 14 can be reduced. Therefore, it is possible to further enhance the stability of the electrical connection between batteries 2.

The method for producing busbar 4 according to the present exemplary embodiment includes a step that is performed before the step of forming terminal joints 14, the method including the step of applying pressure to pressure-weld a plurality of electric wires in a plurality of second regions 32 including respective first regions 30 in the bundle to form precursor terminal joint 28 in first region 30, and forming voltage detection line connector 18 in remaining region 36 of second region 32 except for first region 30. Therefore, busbar 4 according to the present exemplary embodiment includes voltage detection line connector 18 disposed between terminal joint 14 and coupler 16.

By providing voltage detection line connector 18 in busbar 4, the electrical connection between busbar 4 and the voltage detection line can be obtained more reliably. Thus, the reliability of battery module 1 can be further enhanced. By first-stage pressure-welding, voltage detection line connector 18 and precursor terminal joint 28 are formed, and by second-stage pressure-welding, precursor terminal joint 28 is finished into terminal joint 14. This can make the thickness of voltage detection line connector 18 larger than the thickness of terminal joint 14. Therefore, it is possible to reduce the welding time by thinning terminal joint 14, thus preventing battery 2 from being damaged by heat during welding, and to prevent an increase in the electric resistance of busbar 4 and a decrease in the heat capacity by thickening voltage detection line connector 18.

The exemplary embodiment of the present invention has been described in detail. The exemplary embodiment described above is only a specific example for carrying out the present invention. The content of the exemplary embodiment does not limit the technical scope of the present invention, and many design changes such as changes, additions, and deletions of components are possible without departing from the spirit of the invention defined in the claims. The new modified exemplary embodiment has both the effects of the combined exemplary embodiment and the modification. In the exemplary embodiment described above, a description such as "of the present exemplary embodiment" or "in the present exemplary embodiment" is attached to emphasize the content on which the design change as thus described can be made, but the design change is allowed even in content without such a description. Any combination of components included in the exemplary embodiment is also effective as an aspect of the present invention. The hatching on the cross-section of the drawing does not limit the material of the object to which the hatching has been applied.

(Modification 1)

Figure 4:
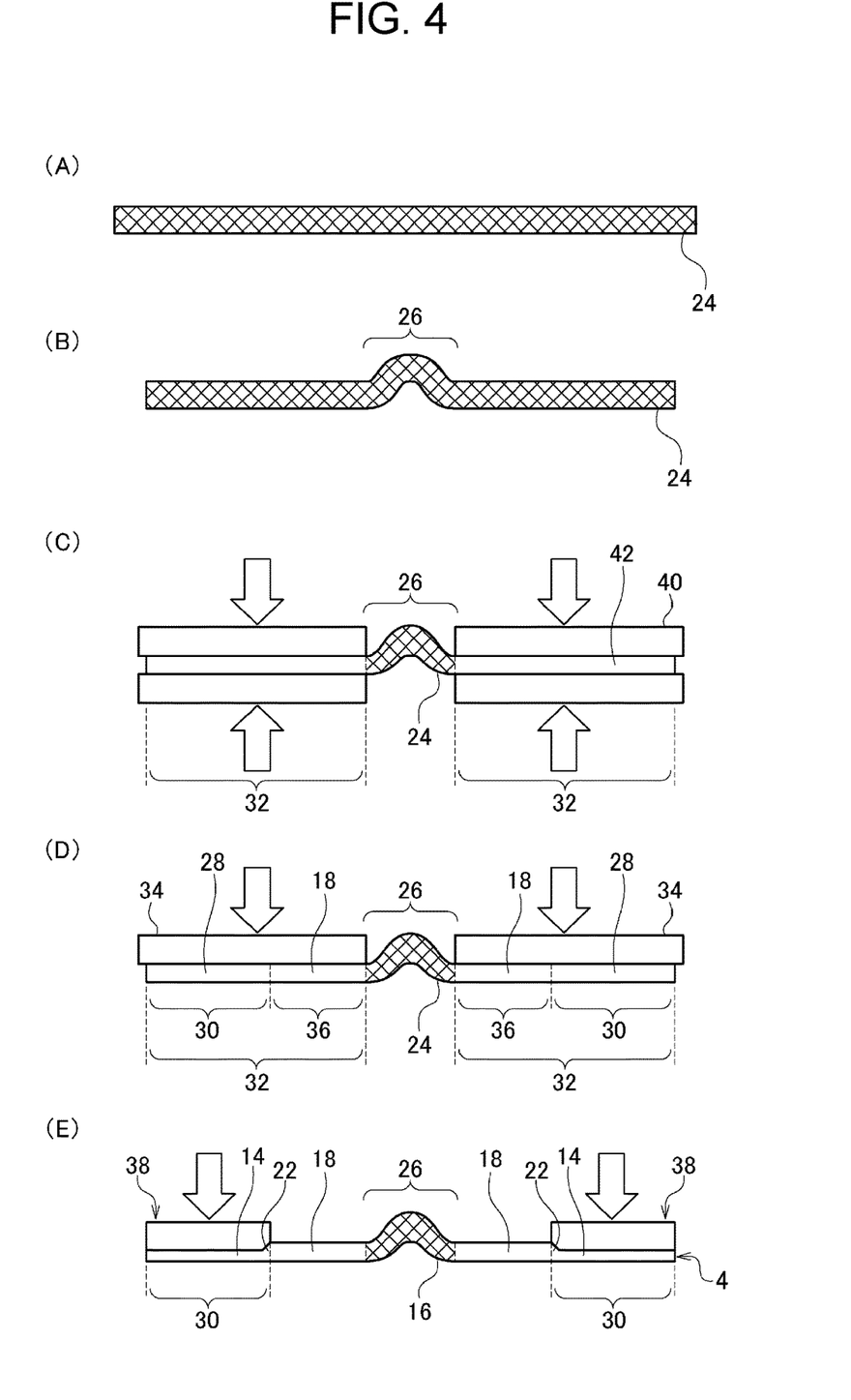

FIG. 4(A) to FIG. 4(E) are side views illustrating a production process for a busbar according to Modification 1. The present modification is different from the exemplary embodiment in including a heat-welding step. Specifically, as illustrated in FIG. 4(A), for example, flat stranded wire 24 is prepared as a bundle of a plurality of electric wires. Then, as illustrated in FIG. 4(B), the center part of flat stranded wire 24 is bent to form curve 26.

Subsequently, as illustrated in FIG. 4(C), the heat-welding step is performed. In this step, hot plate 40 is pressed against the plurality of second regions 32 to heat and pressurize each second region 32. As a result, a plurality of electric wires extending in the respective second regions 32 are heat-welded to each other to form heat-welded part 42. In this step, the heating temperature of second region 32 is, for example, 300° C. to 1200° C. The magnitude of the force applied to second region 32 is, for example, 1000 kN to 4000 kN.

Subsequently, as illustrated in FIG. 4(D), a step of forming precursor terminal joint 28 and voltage detection line connector 18 is performed. In this step, first press die 34 is pressed against the plurality of second regions 32 to apply predetermined pressure on each second region 32. By first press die 34 being pressed against each second region 32, a portion of heat-welded part 42 extending in first region 30 becomes precursor terminal joint 28, and a portion of second region 32 extending in remaining region 36 becomes voltage detection line connector 18.

Subsequently, as illustrated in FIG. 4(e), a step of forming terminal joint 14 is performed. In this step, second press die 38 is pressed against each first region 30 to apply predetermined pressure on each first region 30. By second press die 38 being pressed against first region 30, precursor terminal joint 28 becomes a terminal joining part 14. Further, by second press die 38 being pressed against first region 30, slope 22 is formed at the edge close to the non-pressure-welded region in first region 30.

Curve 26 is not heated or pressure-welded by any of hot plate 40, first press die 34, and second press die 38, and a plurality of electric wires remain in a non-pressure-welded state. This portion serves as coupler 16. By the above steps, busbar 4 is obtained.

In the present modification, the region of flat stranded wire 24 to be subjected to press working is subjected to heat-welding treatment before press working. This facilitates subsequent press working. Further, the working accuracy of terminal joint 14 and voltage detection line connector 18 in press working can be enhanced. Note that the press working using first press die 34 may be omitted, and voltage detection line connector 18 and precursor terminal joint 28 may be formed by heat-welding.

(Modification 2)

Figure 5:
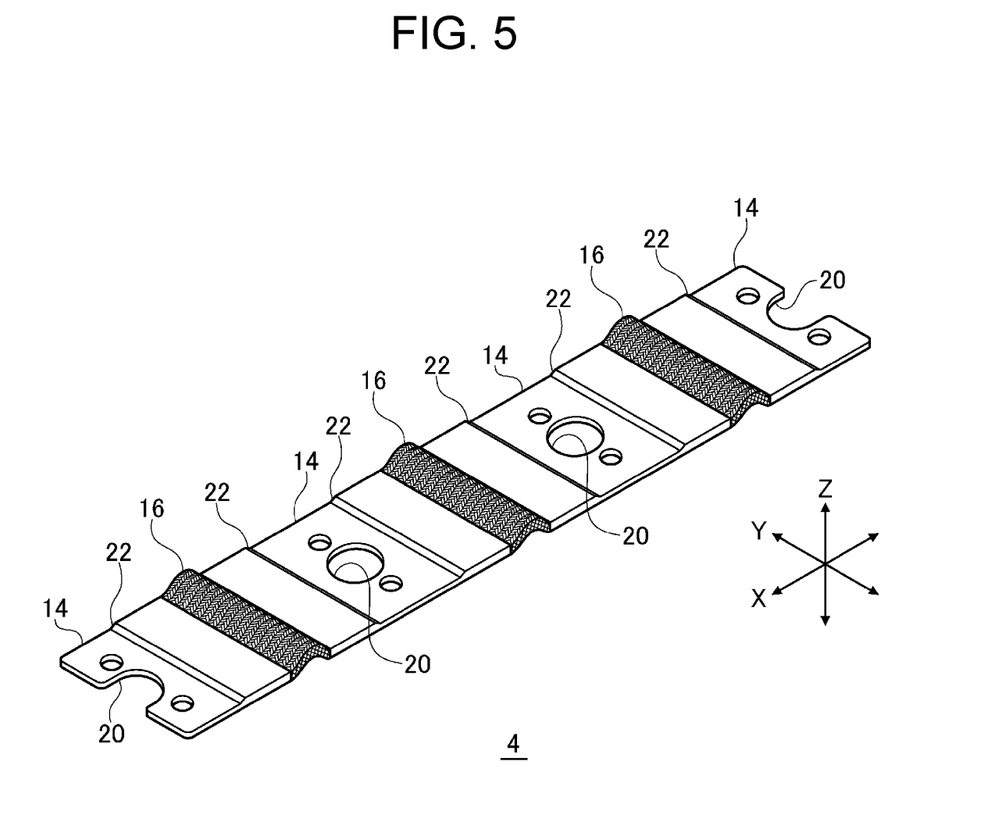
FIG. 5 is a perspective view of a busbar according to Modification 2.

FIG. 5 is a perspective view of a busbar according to Modification 2. In the exemplary embodiment, busbar 4 has two terminal joints 14, but the present invention is not limited to this configuration, and busbar 4 may have three or more terminal joints 14. Busbar 4 according to Modification 2 has four terminal joints 14. According to busbar 4 having three or more terminal joints 14, a battery block in which a plurality of batteries 2 are connected in parallel can be formed, and the battery blocks, or the battery block and battery 2, can be connected in series.

Note that a number of terminal joints 14 provided in busbar 4 can be easily changed by, for example, the following method. That is, flat stranded wire 24 having a length corresponding to the plurality of busbars 4 is set on a press working line, and a plurality of terminal joints 14 are formed continuously or simultaneously in flat stranded wire 24. Thereafter, according to the number of terminal joints 14 provided in busbar 4 to be produced, the cutting position of processed flat stranded wire 24 is adjusted. This can facilitate the mass-production of busbar 4 having any number of terminal joints 14. It is thereby possible to enhance the degree of freedom in designing battery module 1.

(Other Modifications)

In the exemplary embodiment and modifications, terminal joint 14 and voltage detection line connector 18 are formed in the two stages, which are the pressure-welding by first press die 34 and the pressure-welding by second press die 38. However, the present invention is not limited to this configuration. For example, by using a press die having a stepped part that corresponds to the difference between the thickness of terminal joint 14 and the thickness of voltage detection line connector 18, terminal joint 14 and voltage detection line connector 18 may be formed simultaneously by one press.

Voltage detection line connector 18 may be omitted. In this case, busbar 4, in which coupler 16 and terminal joint 14 are directly connected, is obtained. A number of batteries 2 provided in battery module 1 is not particularly limited. The structure of each part of battery module 1, including the shapes of end-plate 6 and restraint member 8 and the fastening structures of end-plate 6 and restraint member 8, is not particularly limited, either.

REFERENCE MARKS IN THE DRAWINGS

1: battery module
2: battery
4: busbar
12: output terminal
14: terminal joint
16: coupler
18: voltage detection line connector
22: slope
24: flat stranded wire
28: precursor terminal joint
30: first region
32: second region

The invention claimed is:

1. A method for producing a busbar that electrically connects a plurality of batteries, the method comprising
forming a plurality of terminal joints that are joined to output terminals of the respective batteries by applying pressure to pressure-weld a plurality of electric wires in a plurality of first regions in a bundle of the plurality of electric wires, each first region being a depressed portion of a second region, such that the thickness of the first region is less than the thickness of the remainder of the second region, the first regions being arranged at a predetermined interval in an extending direction of the bundle, wherein the forming of the terminal joints includes forming a slope having a thickness gradually increasing from the thickness of the first region to the thickness of the remainder of the second region.

2. The method for producing a busbar according to claim 1, wherein the bundle is a flat stranded wire.

3. The method for producing a busbar according to claim 2, wherein a center part of the flat stranded wire is bent to form a curve.

4. The method for producing a busbar according to claim 1, the method further comprising, before forming the terminal joints, a step of applying pressure to pressure-weld the plurality of electric wires in a plurality of second regions to form a precursor terminal joint in each of the plurality of first regions, and a voltage detection line connector in a region within the remainder of the second region.

5. The method for producing a busbar according to claim 1, wherein before forming the plurality of terminal joints a heat-welding step is performed comprising pressing a hot plate against the plurality of second region on each second region.

6. The method for producing a busbar according to claim 5, wherein a heating temperature of second region is 300° C. to 1200° C., and a magnitude of force applied to second region is 1000 kN to 4000 kN.

7. A busbar electrically connecting a plurality of batteries, the busbar comprising:
a plurality of terminal joints that are joined to output terminals of the respective batteries; and a coupler that connects the plurality of terminal joints, wherein the coupler is formed of a non-pressure-welded part in a bundle of a plurality of electric wires, and each of the plurality of terminal joints is formed of a pressure-welded part in the bundle, wherein the pressure welded part comprises at least one first region, each first region being a depressed portion of a second region, such that the thickness of the first region is less than the thickness of the remainder of the second region, and each of the terminal joints has a slope at an edge close to the coupler, the slope having a thickness gradually increasing toward the coupler from the thickness of the first region to the thickness of the remainder of the second region.

8. The busbar according to claim 7, wherein the bundle is a flat stranded wire.

9. The busbar according to claim 8, wherein a center part of the flat stranded wire is bent to form a curve.

10. The busbar according to claim 7,
comprising a voltage detection line connector disposed between each of the terminal joint and the coupler.

11. The busbar according to claim 7,
comprising three or more terminal joints.

12. A battery module comprising:
the busbar according to claim 7; and
the plurality of batteries electrically connected by the busbar.

* * * * *